United States Patent
Knapen

Patent Number: 5,996,212
Date of Patent: Dec. 7, 1999

[54] METHOD OF MANUFACTURING A BODY HAVING A STRUCTURE OF LAYERS

[75] Inventor: Peter S. A. Knapen, Eindhoven, Netherlands

[73] Assignee: U.S. Philips Corporation, New York, N.Y.

[21] Appl. No.: 09/040,791

[22] Filed: Mar. 18, 1998

[30] Foreign Application Priority Data

May 23, 1997 [EP] European Pat. Off. .............. 97201539

[51] Int. Cl.$^6$ .......................... G11B 5/127; G11B 5/147; B44C 1/22; B05D 5/12

[52] U.S. Cl. ..................................... 29/603.07; 427/126.1; 427/126.3; 427/126.4; 427/126.5; 427/127; 427/207.1; 427/307; 216/58; 216/76; 216/79; 216/95; 216/102; 29/603.01; 29/603.17; 29/603.18; 29/603.19; 29/603.2; 360/125; 360/126

[58] Field of Search .............................. 427/126.1, 126.3, 427/126.4, 126.5, 127, 207.1, 307; 216/58, 76, 79, 95, 102; 29/603.01, 603.07, 603.17, 603.18, 603.19, 603.2; 360/125, 126

[56] References Cited

U.S. PATENT DOCUMENTS 5,225,953  7/1993  Wada et al. .............................. 360/126
5,326,429  7/1994  Cohen et al. ............................ 156/655

*Primary Examiner*—Samuel A. Acquah
*Attorney, Agent, or Firm*—David R. Treacy

[57] ABSTRACT

Method of manufacturing a multilayer structure, in which method gold is deposited on a basic layer (3, 11) for forming a gold layer (7, 13), whereafter aluminium oxide is deposited on the gold layer for forming an aluminium oxide layer (9, 15). Silicon oxide is deposited on the aluminium oxide layer by means of PE-CVD for forming a silicon oxide layer (11, 13), and the aluminium oxide layer constitutes an adhesive layer between the gold layer and the silicon oxide layer. Together with the aluminium oxide layer, the silicon oxide layer constitutes an insulating and/or protective cladding layer for the gold layer.

10 Claims, 2 Drawing Sheets

METHOD OF MANUFACTURING A BODY HAVING A STRUCTURE OF LAYERS

BACKGROUND OF THE INVENTION

The invention relates to a method of manufacturing a multilayer structure, in which method gold is deposited on a basic layer for forming a gold layer, whereafter aluminium oxide is deposited on the gold layer for forming an aluminium oxide layer.

Such a method is known from U.S. Pat. No. 5,225,953. In the known method, a thin-film magnetic head is manufactured, in which method coil turns of Au, Cu, Cr or Al are formed on a non-magnetic layer of, for example $SiO_2$ or $Al_2O_3$. An insulation layer of $SiO_2$ or $Al_2O_3$ is formed on the coil turns, which layer insulates the coil turns from a magnetic pole to be provided.

A drawback of the known method is that the oxide $SiO_2$ poorly adheres to the metal Au so that, in practice, a silicon oxide layer provided on a gold layer yields problems of adhesion. A further drawback is that sputtering of $SiO_2$ or $Al_2O_3$ is a relatively slow deposition process so that notably thicker layers require a long production time.

OBJECTS AND SUMMARY OF THE INVENTION

It is an object of the invention to improve the known method in such a way that a solid and reliable adhesion between a gold layer and a silicon oxide layer is obtained, requiring only a relatively short process time.

To this end, the method according to the invention is characterized in that silicon oxide is deposited on the aluminium oxide layer by means of PE-CVD (Plasma Enhanced Chemical Vapor Deposition) for forming a silicon oxide layer, with the aluminium oxide layer constituting an adhesive layer between the gold layer and the silicon oxide layer, and the silicon oxide layer together with the aluminium oxide layer constituting a cladding layer for the gold layer.

It has been found that a solid adhesion between the gold layer and the silicon oxide layer can be realized by using the aluminium oxide layer as an adhesive layer. The aluminium oxide layer only needs to have a small layer thickness and can be formed by means of sputtering, for example RF diode sputtering in an Ar atmosphere. A layer thickness of, for example between 5 and 200 nm has been found to be sufficient. The thickness of the silicon oxide layer formed by means of PE-CVD is dependent on the use of the multilayer structure and, in principle, may have any value. PE-CVD is a rapid deposition method so that the silicon oxide layer can be realized within a relatively short time. For example, as compared with sputtering, PE-CVD is approximately a factor of 1000 faster. The gold layer may be formed by means of electroplating, in which the basic layer comprising, for example a layer of sputtered Mo and a layer of sputtered Au functions as a seed layer, or may be formed by means of a different deposition technique. The protective layer formed may have, for example an insulating and/or protective function.

It is to be noted that in U.S. Pat. No. 5,326,429, from which a method of pattern etching an alumina layer is known, particularly column 6, lines 14 and 15 state that gold poorly adheres to alumina. In order to improve the adhesion, it is proposed to provide a metallic intermediate layer between an alumina layer and a gold layer to be formed. In practical applications, metallic intermediate layers often cause problems in that they cause electric through-connections.

An embodiment of the method according to the invention is characterized by the measures defined in claim 2. Coil turns of gold are corrosion-resistant and have a relatively low electric resistance, while connection faces of gold also have the advantage that connections can be easily realized. In a practical implementation, the removal of silicon oxide and aluminium oxide at the area of a connection face during performance of the method is preferably effected by means of etching, for example wet-chemical etching. As compared with a cladding layer which exclusively consists of aluminium oxide, the cladding layer formed by means of the method according to the invention has the advantage that the capacitive coupling between the coil turns is relatively low due to the low relative dielectric constant of silicon oxide with respect to the relative dielectric constant of aluminium oxide.

The invention also relates to a component having a multilayer structure obtained by means of the invention. Such a component is, for example a passive component such as a thin-film coil, for example for use in printed circuit boards, in which the basic layer of the multilayer structure is provided on a substrate. The substrate may be a silicon substrate, but in the case of high-frequency uses, non-conducting substrates such as glass are preferred. An $SiO_2$ coating, preferably a PE-CVD $SiO_2$ coating may be provided on the substrate.

An embodiment of the component according to the invention is characterized as defined in claim 8. It has been found that said layer thickness of the aluminium oxide layer is sufficient for a strong adhesion, while said layer thickness of the silicon oxide layer gives sufficient protection against scratches and/or short-circuit.

The invention also relates to a thin-film magnetic head having a multilayer structure according to the invention. An embodiment of the magnetic head according to the invention is characterized as defined in claim 10.

These and other aspects of the invention are apparent from and will be elucidated with reference to the embodiments described hereinafter.

DESCRIPTION OF THE PREFERRED EMBODIMENTS

Figure 1:
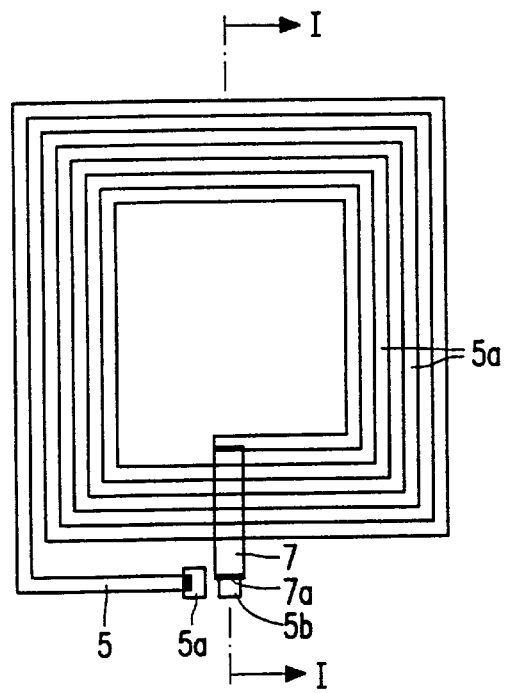
FIG. 1 is a diagrammatic plan view of an embodiment of the component, particularly a thin-film coil according to the invention.
Figure 2:
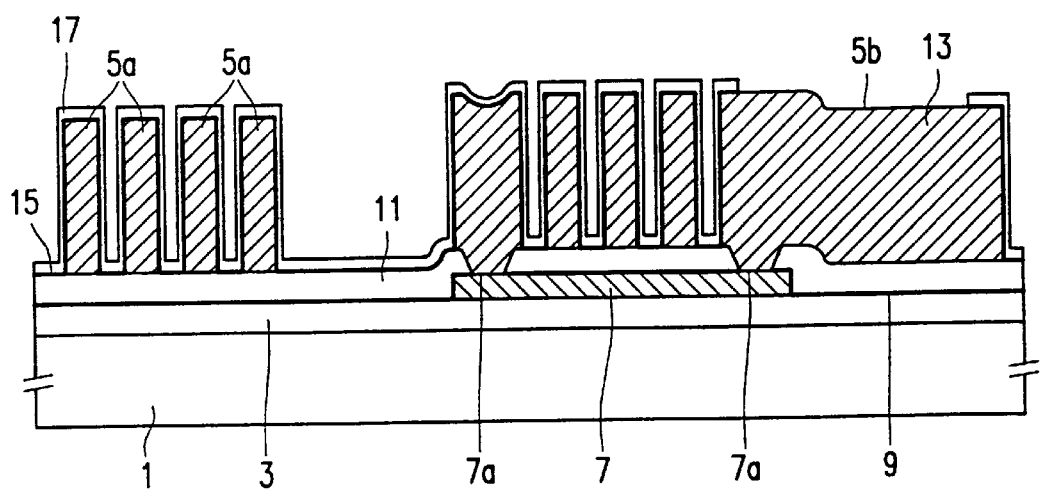
FIG. 2 is a diagrammatic cross-section taken on the line I—I in FIG. 1 of the component shown in FIG. 1.

The passive component shown in FIGS. 1 and 2 comprises a substrate 1 of glass and a multilayer structure present on the substrate 1, particularly a thin-film structure. Instead of glass as a substrate material, a different material such as silicon or a ceramic material may be used. The multilayer structure comprises a basic layer 3 of $SiO_2$ formed by means of PE-CVD, on which a thin-film coil 5 of gold having a plurality of coil turns 5a and connection faces 5b is formed via a number of technology steps.

In the manufacture of the component shown, use is made of the method according to the invention. Such a manufacturing process comprises the steps of forming the basic layer 3, whereafter a gold layer 7 is formed by means of electroplating of Au after sputtering deposition of Mo and Au for forming a seed layer. In this embodiment, this layer serves as a through-connection layer. An aluminium oxide layer 9 is formed on the gold layer 7 by sputtering of $Al_2O_3$. $SiO_2$ for forming a cladding layer 11 serving as a further basic layer is deposited on this layer 9 by means of PE-CVD. The layers 9 and 11 are subsequently structured in an area extending opposite the gold layer 7, using known techniques, for example etching for forming through-connection faces 7a. After deposition of Mo and Au for forming a further seed layer, a further gold layer 13 is formed by electroplating of Au on the basic layer 11. This gold layer 13 is structured by means of known techniques for forming the coil 5 with the coil turns 5a which is in electric contact with the gold layer 7 at the area of the through-connection faces 7a. After structuring, $Al_2O_3$ is sputtered on the gold layer 13 for forming an aluminium oxide layer 15, whereafter $SiO_2$ is deposited by means of PE-CVD for forming a silicon oxide layer 17. The connection faces 5b are formed by removing material, for example by means of etching such as wet-chemical etching from the layers 15 and 17. It is to be noted that the layers 9 and 11 form a cladding layer for the gold layer 7 which mainly has an insulating function, while the layers 15 and 17 form a cladding layer which has an insulating and a protective function. The aluminium oxide layers preferably have a thickness in the range between 5 and 200 nm, and the silicon oxide layers preferably have a thickness in the range between 0.1 and 50 $\mu$m.

Figure 3:
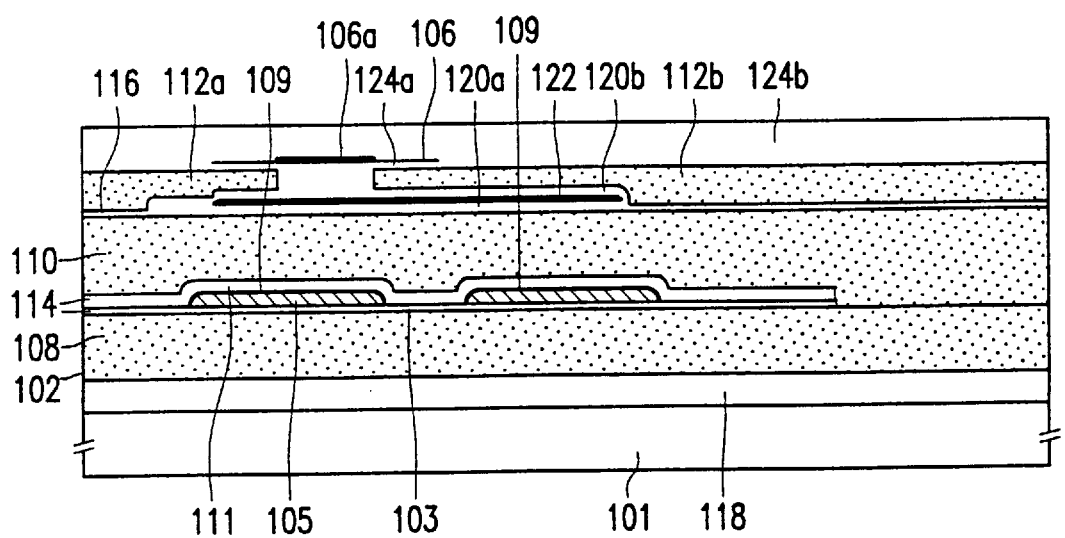
FIG. 3 is a diagrammatic cross-section of an embodiment of the thin-film magnetic head according to the invention.

The thin-film magnetic head shown in FIG. 3 is a combined read-write head, particularly intended for co-operation with a magnetic medium such as a magnetic tape. The magnetic head has a head face 102 and comprises an inductive transducing element 105, a magnetoresistive transducing element 106 with a barberpole structure 106a of conducting strips and three flux guides 108, 110 and 112a, 112b. The flux guides 108 and 110 constitute a magnetic yoke for the inductive transducing element 105 and bound a write gap 114 on the head face 102. The flux guides 110 and 112a, 112b constitute a magnetic yoke for the magnetoresistive transducing element 106 and bound a read gap 116 on the head face, while a space between the flux guide parts 112a and 112b is bridged by the magnetoresistive transducing element 106.

Such a magnetic head may be manufactured in the following manner, using the method according to the invention. $SiO_2$ for forming an $SiO_2$ coating 118 is deposited by means of PE-CVD on a substrate 101 of, for example a ceramic material such as $Al_2O_3$/TiC. Subsequently, a magnetic material is deposited on this coating, for example by sputtering NiFe for forming the flux guide 108, whereafter $SiO_2$ is deposited by means of PE-CVD for forming a basic layer 103 of $SiO_2$. The inductive transducing element 105 is formed on this basic layer 103 after deposition of Mo and Au for forming a seed layer by means of electroplating of Au and a suitable structuring. The transducing element 105 may comprise one or more coil turns. After the formation of the transducing element 105, $Al_2O_3$ is deposited, preferably by means of sputtering, for forming an aluminium oxide layer 109. $SiO_2$ for forming a cladding layer 111 serving as an insulation layer is deposited on the relatively thin layer 109 by means of PE-CVD. Subsequently, the flux guide 110 is formed on the layer 111 by deposition of a magnetic material such as NiFe, on which, successively, a layer 120a of $SiO_2$ is formed by means of PE-CVD, a bias conductor 122 is formed by deposition of an electrically conducting metal such as copper, a layer 120b of $SiO_2$ is formed by means of PE-CVD, the flux guide parts 112a and 112b are formed by deposition of a magnetic material and a layer 124a of $SiO_2$ is formed by means of PE-CVD. Subsequently, the magnetoresistive transducing element 106 is provided, whereafter an end layer 124b of $SiO_2$ is formed by means of PE-CVD, on which end layer a counter block may be secured. Known thin-film techniques and deposition and structuring methods may be used in the manufacture of the magnetic head.

It is to be noted that the invention is not limited to the embodiments shown. For example, it is possible to provide the magnetic head according to the invention exclusively with one or more inductive transducing elements. Also passive components other than those shown, for example a thin-film coil with a larger or smaller number of turns than is shown, or a multichip module may form part of the invention. The essence of the invention, howver, is the use of an aluminium oxide layer as an adhesive layer between a gold layer and a silicon oxide layer during manufacturing a multilayer structure.

What is claimed is:

1. A method of manufacturing a multilayer structure, in which method gold is deposited on a basic layer for forming a gold layer, whereafter aluminium oxide is deposited on the gold layer for forming an aluminium oxide layer, characterized in that silicon oxide is deposited on the aluminium oxide layer by means of PE-CVD (Plasma Enhanced Chemical Vapor Deposition) for forming a silicon oxide layer, the aluminium oxide layer constituting an adhesive layer between the gold layer and the silicon oxide layer, and the silicon oxide layer together with the aluminium oxide layer constituting a cladding layer for the gold layer.

2. A method as claimed in claim 1, characterized in that, prior to forming the aluminium oxide layer, the gold layer is structured to form at least a coil turn having at least one coil connection face, while after forming the silicon oxide layer, silicon oxide and aluminium oxide are removed at the area of the connection face for leaving said connection face clear.

3. A method as claimed in claim 2, characterized in that silicon oxide and aluminium oxide are removed by means of etching.

4. A method as claimed in claim 1, characterized in that aluminium oxide is deposited by means of sputtering.

5. A method as claimed in claim 1, characterized in that gold is deposited by means of electroplating.

6. A component having a multilayer structure obtained by means of the method as claimed in claim 1.

7. A component as claimed in claim 6, being a passive component, in which the basic layer is provided on a substrate.

8. A component as claimed in claim 6, characterized in that the aluminium oxide layer has a thickness in the range between 5 and 200 nm, and the silicon oxide layer has a thickness in the range between 0.1 and 50 $\mu$m.

9. A thin-film magnetic head having a multilayer structure obtained by means of the method as claimed in claim 1.

10. A thin-film magnetic head as claimed in claim 9, in which the basic layer is provided on a substrate and the gold layer is structured to form an inductive transducing element.

* * * * *